No. 830,163. PATENTED SEPT. 4, 1906.
W. R. McKEEN, Jr.
WEED CUTTER.
APPLICATION FILED OCT. 10, 1904.

2 SHEETS—SHEET 1.

No. 830,163. PATENTED SEPT. 4, 1906.
W. R. McKEEN, Jr.
WEED CUTTER.
APPLICATION FILED OCT. 10, 1904.

2 SHEETS—SHEET 2.

Witnesses
J. M. Fowler Jr.
Edwin E. Vrooman

Inventor
Wm. R. McKeen Jr.
By Mason, Fenwick & Lawrence,
his Attorneys

UNITED STATES PATENT OFFICE.

WILLIAM R. McKEEN, JR., OF OMAHA, NEBRASKA.

WEED-CUTTER.

No. 830,163.         Specification of Letters Patent.         Patented Sept. 4, 1906.

Application filed October 10, 1904. Serial No. 227,968.

*To all whom it may concern:*

Be it known that I, WILLIAM R. McKEEN, Jr., a citizen of the United States, residing at Omaha, in the county of Douglas and State of Nebraska, have invented certain new and useful Improvements in Weed-Cutters; and I do hereby declare the following to be a full, clear, and exact description of the invention, such as will enable others skilled in the art to which it appertains to make and use the same.

This invention relates to improvements in mowing mechanisms which are adapted to be applied to moving supports, and more particularly to the running-gear of a railway-car.

The object of the invention is the provision of means for the cutting of weeds and grass along the road-bed of railways.

Another object of the invention is the provision of mowing means which is secured to a movable frame, said frame being adapted to be carried by a car running upon a railroad-track or other tramway.

A still further object of the invention is to improve the construction of a framework which is to be secured to a railroad-car, cutting means carried by said framework, and adjusting means for said cutting means positioned upon said framework.

With these and further objects in view the invention consists in certain novel constructions, combinations, and arrangements of parts, as will be hereinafter fully described and claimed.

Figure 1:
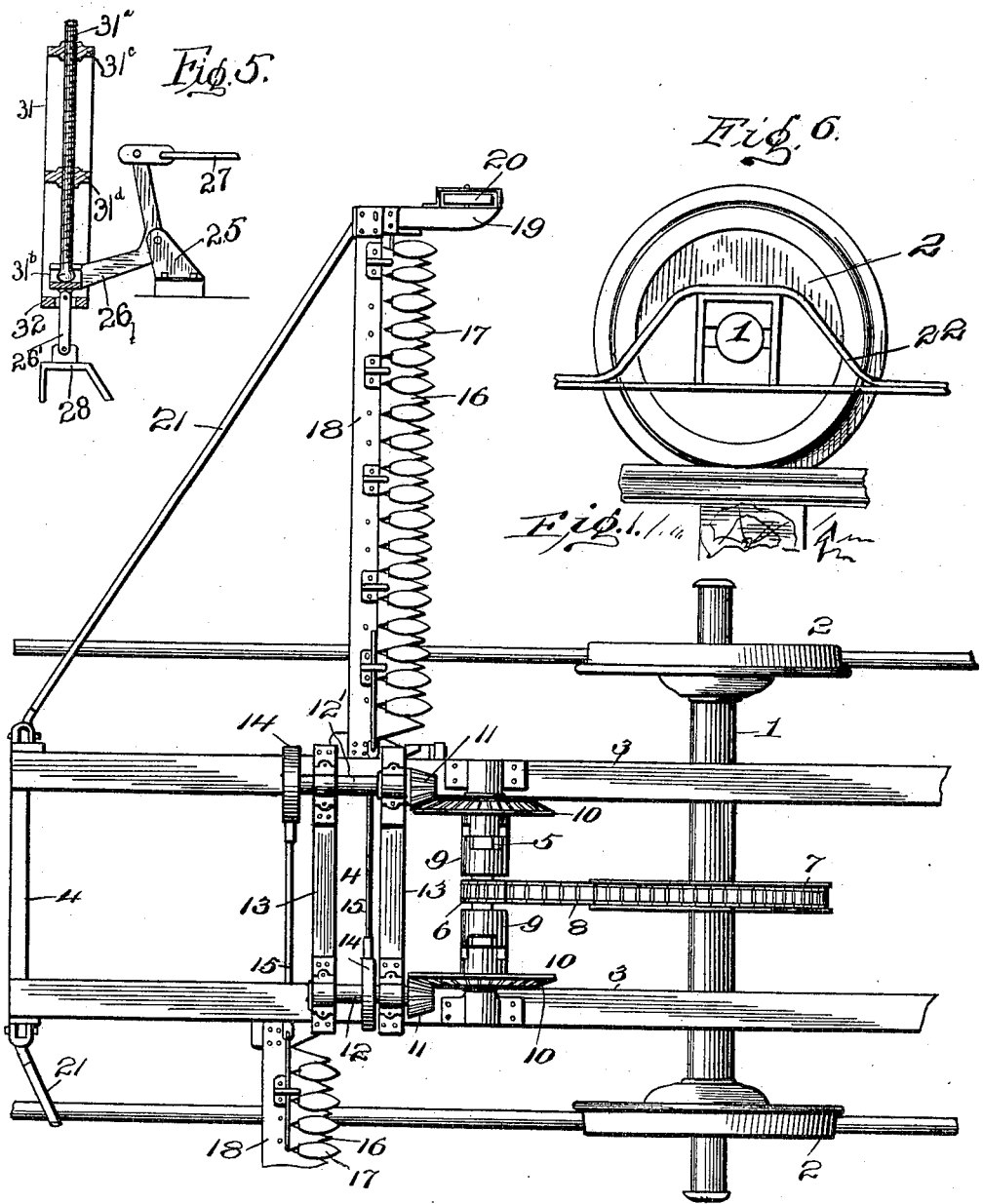
Figure 2:
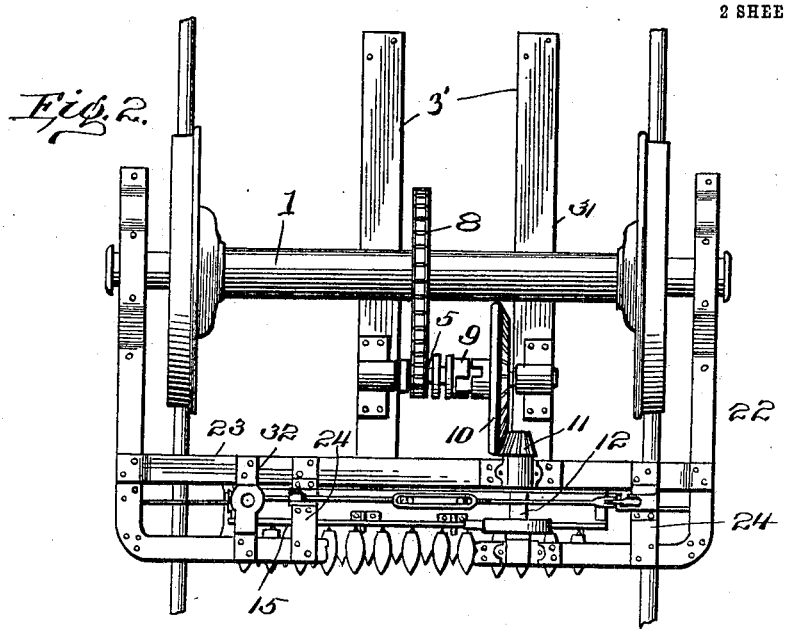
Figure 3:
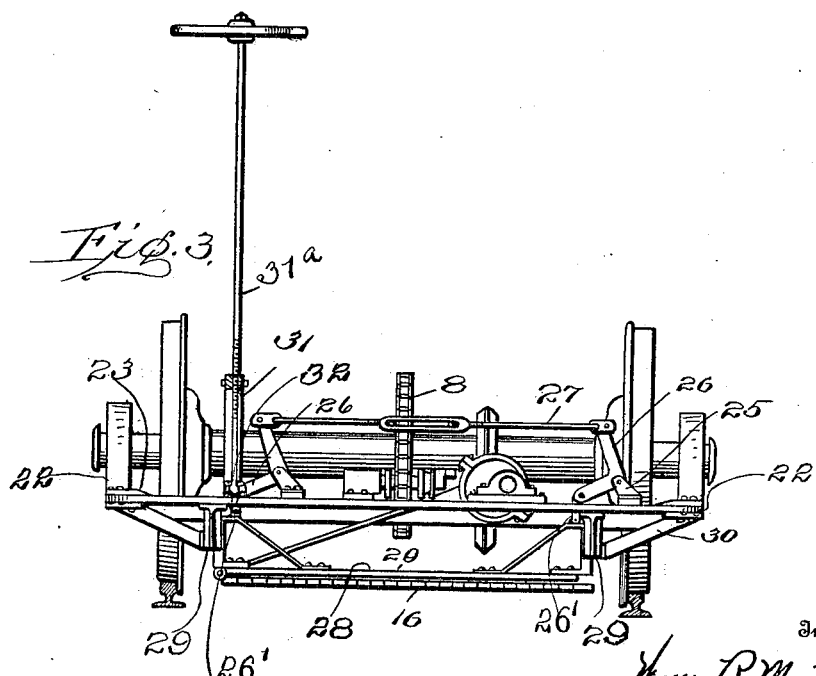

In the accompanying drawings, Figure 1 represents a fragmentary plan view of a device constructed in accordance with the present invention. Fig. 2 is a plan view of another embodiment of the present invention, showing a portion of the supporting-frame broken away. Fig. 3 is a view in front elevation of the embodiment depicted in Fig. 2. Fig. 4 is a fragmentary front-view in elevation of the embodiment depicted in Fig. 3. Fig. 5 is a fragmentary view, in side elevation, of the adjusting means for the knife-carrying frame. Fig. 6 is an elevated fragmentary side view of the mechanism depicted in Fig. 2, showing a portion of the frame arched over the axle.

Referring to the drawings by reference-numerals, and particularly to Fig. 1, 1 designates an axle upon which are journaled wheels 2 2.

The framework of the present invention comprises in its construction a plurality of parallel bars or beams 3 3, which are secured in an assembled position by means of transverse connecting members 4 4.

A shaft 5 is journaled at each of its ends upon the parallel beams 3 3, and upon said shaft 5 there is keyed a gear-wheel 6. Keyed to shaft 1 is a comparatively large gear or sprocket wheel 7, upon which is mounted a sprocket-chain 8, which is also positioned around gear or sprocket wheel 6. Clutch members 9 9 are positioned upon shaft 5 and are adapted to be moved longitudinally thereon into engagement with beveled gears 10 10, which are loosely journaled upon the shaft 5 and are normally in engagement with beveled gears 11. The beveled gears 11 are positively secured to parallel shafts 12 and 12', which are journaled upon parallel beams 13 13, secured at right angles to said shafts 12 and 12' upon the parallel beams 3 3 of the frame. The shaft 12 is provided with an eccentric, which is secured thereto intermediate the parallel transverse beams 13 13. An eccentric-band 14, to which is secured an eccentric-rod 15, is secured upon the eccentric of shaft 12. An eccentric is secured upon one end of shaft 12', and upon said eccentric there is positioned an eccentric-band 14, to which is secured an eccentric-rod 15. A pivotally-mounted reciprocating knife 16 is positioned upon each side of the frame, said knives being protected by means of finger-guards 17. The detail construction of the reciprocating knives and their guards is not specifically designated herein, as such construction is of the ordinary type disclosed in the patented art. Upon the outer end of the supporting means 18 for each of the knives there is secured at right angles thereto a bracket 19, upon which is journaled a guide-wheel 20. Secured to the rear portion of the frame and to the outer ends of each of the supporting means 18 are connecting-rods 21, which are provided for supporting and preventing longitudinal movement of the reciprocating knives and their coacting elements. The eccentric-rods 15 15 are secured to the reciprocating knives in any ordinary manner.

Referring to the embodiment illustrated in Figs. 2 and 3, the parallel beams 3' 3' are positioned beneath the axle 1 and are secured to the approximately U-shaped sectional metallic frame 22. The frame 22 is positioned upon the axle 1 outside of the wheels, as clearly seen in Fig. 2, and therefore partly encircles the wheels. The frame 22 is positioned in a horizontal plane below that of the axle 1, thereby necessitating the sides of the frame to be curved near their rear ends for the purpose of positioning said frame upon the outer ends of the spindles of axle 1.

The gearing mechanism for operating the reciprocatory cutting means in this embodiment is similar to that disclosed in the embodiment depicted in Fig. 1, except that instead of a plurality of clutch members 9 and beveled gear-wheels 10 being positioned upon shaft 5 only a single gear-wheel and clutch member is placed thereon. A transverse bar 23 is secured to the sides of the frame, near the forward ends thereof. A plurality of parallel connecting members 24 is positioned upon the forward portion of the approximately U-shaped frame 22 and the bar 23. A lug 25 is mounted upon each of the connecting members 24. A bell-crank lever 26 is journaled upon each of the lugs 25, said bell-crank levers being connected by an adjustable rod 27 near their outer ends. The lower ends of each of the bell-crank levers 26 are connected, by means of a link 26', to a knife-supporting frame 28. Said knife-supporting frame is slidably mounted in vertical guides 29 29, which are secured to the under side of the approximately U-shaped frame 22. A reinforcing member 30 is secured to each of said guide members 29 and to the frame 22, near the side thereof. A post 31 is positioned upon a connecting member 32, which extends parallel to one of the members 24. Said post 31 supports an adjusting mechanism, which is connected to the lower end of one of the bell-crank levers for the purpose of imparting movement to the levers for adjusting the reciprocatory cutting means 16, carried by the frame 28.

The adjusting mechanism comprises an adjustable manually-operated member 31$^a$, which is provided with an integral ball 31$^b$, formed upon its lower end. The ball 31$^b$ is loosely positioned within a slot formed in one end of the left-hand bell-crank lever 26. When member 31$^a$ is rotated, it is adjusted upon the post 31, and by reason of the fact that it is movably connected to one of the bell-crank levers 26 movement is imparted to said levers, thereby adjusting the knife-carrying frame, as said levers 26 are connected, by means of the links 26', to the knife-supporting frame 28.

The parallel beams 3 3 in each of the embodiments and also frame 22 may be positioned upon the running-gear or to the beam structure of a railroad-car by any ordinary means. In the embodiment shown in Fig. 1 the weeds and grass along the side of the road-bed can be easily cut by employing the mechanism therein shown, while the weeds and grass between the rails can be easily mown by means of the construction depicted in Figs. 2 and 3. Owing to the movability of the reciprocating knives in a vertical plane, the same can be adjusted according to the different requirements. In Fig. 1 the knives will be raised when the wheel 20 rides over an uneven surface, and the construction of the coöperating elements depicted in Figs. 2 and 3 permits the knife to be positioned manually to different horizontal planes.

While I have described in the foregoing description and depicted in the accompanying drawings the preferred construction of my invention, it will be obvious to one versed in the art to which this invention relates that certain alterations, modifications, and changes may be made, and I therefore reserve the right to make such alterations, modifications, and changes as shall fairly fall within the spirit and scope of the present invention.

Having thus fully described my invention, what I claim as new, and desire to secure by Letters Patent, is—

1. In a device of the character described, the combination of a frame, vertical guiding means secured beneath said frame, a knife adjustably mounted between said guiding means, bell-crank levers carried by said frame, means connecting said levers to said knife, manually-operated means secured to said levers for causing movement thereof, and driving means carried by said frame and connected to said knife for imparting movement thereto.

2. In a device of the character described, the combination with a movable support, of a mowing mechanism carried thereby, comprising a frame, vertical guiding members secured to the bottom of said frame, a knife-frame positioned between said guiding members, a reciprocatory knife carried by said knife-frame, a revoluble shaft journaled upon said frame, an eccentric secured to said shaft, an eccentric-band mounted upon said eccentric, an eccentric-rod connecting said band and knife, driving means for causing movement of said shaft, bell-crank levers mounted upon said frame, links connecting said levers with the knife-frame, an adjustable rod connecting said levers, and means for moving said levers.

3. In a device of the character described, the combination with a movable support provided with a rotatable member, of a frame, a pair of slotted guides secured to said frame, a knife-frame positioned within said slotted portion of the guides, a reciprocatory knife carried by said frame, a lever carried by said frame, means pivotally connecting said knife-frame and lever, manually-operated means connected with said lever and capable of causing adjustment of said knife-frame, a driving mechanism for said knife, comprising a shaft, an eccentric secured to said shaft, an eccentric-band mounted upon said eccentric, said eccentric-band connected to said knife, and means connected to said shaft and the rotatable member of the support and capable of causing rotary movement of said shaft.

4. In a device of the character described, the combination with an axle, and wheels journaled thereon, of an approximately U-shaped frame assembled therewith, said frame provided with raised portions partially encircling the ends of said axle, parallel beams secured in approximately a central position upon said frame, a transverse beam connecting the sides of said approximately U-shaped frame, a shaft journaled upon said parallel beams, a shaft journaled upon the transverse beam and frame, and means operably connecting said shaft carried by the parallel beams with the axle, gears connecting said shafts, an eccentric provided with a collar secured to one of said shafts, a vertically-adjustable knife-frame carried by said frame, a reciprocatory knife secured to said knife-frame, means connecting said knife and eccentric-band, and means capable of causing adjustment of said knife-frame and its knife.

5. In a mechanism of the class described, the combination with an axle provided with wheels, of a frame mounted upon said axle comprising a U-shaped member partially inclosing said wheels, the body portion of said U-shaped member lying in a lower horizontal plane than the axle, a pair of slotted guiding members secured upon the bottom portion of said frame, reinforcing members connecting the sides of the U-shaped member and the lower portion of said guiding members, a knife-frame slidably mounted between said guiding members, a reciprocatory knife carried by said knife-frame, and driving means connecting said reciprocatory knife with the axle.

6. In a mechanism of the class described, the combination with a movable support provided with an axle, of a frame carried by said support and having a portion thereof positioned in a horizontal plane below said axle, reinforced slotted guide members secured to the bottom of said frame, a knife-frame vertically adjustable between said guiding members, a movable knife carried by said knife-frame, and means connecting said knife with the axle.

7. In a device of the character described, the combination with a movable support provided with an axle, of an approximately U-shaped frame secured upon the axle, the body portion of said frame positioned in a plane below said axle, parallel beams secured to said frame and extending below the axle, guides secured beneath said frame, a vertically-adjustable knife positioned between said guides, a shaft journaled upon said frame, an eccentric secured to said shaft, an eccentric-band carried by said eccentric and connected to said knife, and driving means mounted upon said beams and connecting said axle and shaft.

8. In a mechanism of the class described, the combination with a support, of a frame positioned upon said support, the body portion of said frame lying in a horizontal plane below said support, parallel beams secured to said frame and extending below said support, a vertically-adjustable knife secured to the forward portion of said frame, and a driving mechanism for said knife mounted upon said parallel beams.

9. In a mechanism of the class described, the combination with an axle, of a frame assembled with said axle, comprising two parallel, straight beams, a transverse shaft journaled upon said beams parallel to said axle, said shaft provided with a slidable clutch member, a horizontal shaft assembled with said beams, a gear carried by said shaft meshing with a gear carried by said transverse shaft, an eccentric secured to said horizontal shaft, driving means connecting said axle and transverse shaft, a vertically-adjustable, reciprocatory knife assembled with said beams, an eccentric-band positioned upon said eccentric, and connecting means extending parallel to said axle and secured to said knife and eccentric-band.

In testimony whereof I hereunto affix my signature in presence of two witnesses.

WILLIAM R. McKEEN, Jr.

Witnesses:
CHARLES L. DUNDEY,
FRANCIS J. MIEDING.